April 14, 1959     N. GEERTSEN     2,881,729
SOLDER WIPER
Filed Feb. 11, 1955     2 Sheets-Sheet 1

INVENTOR.
NELSON GEERTSEN
BY
ATTORNEYS

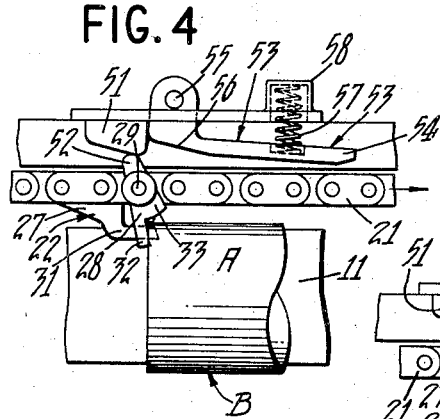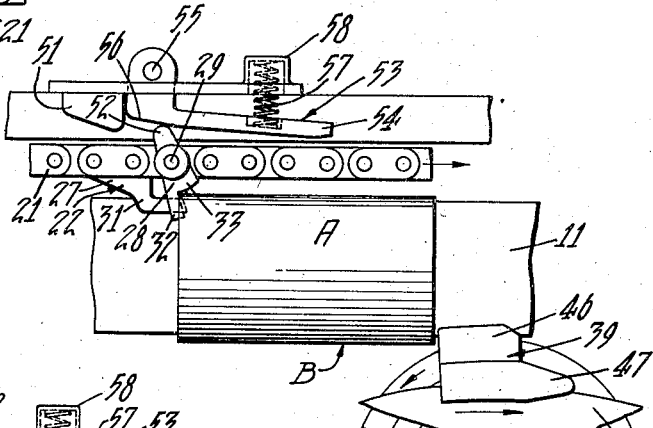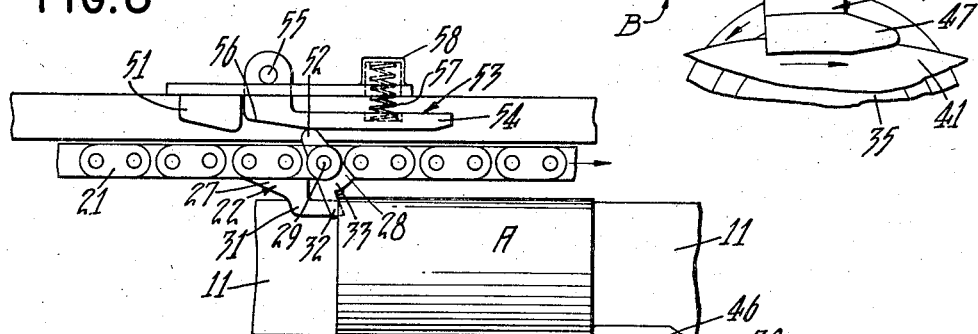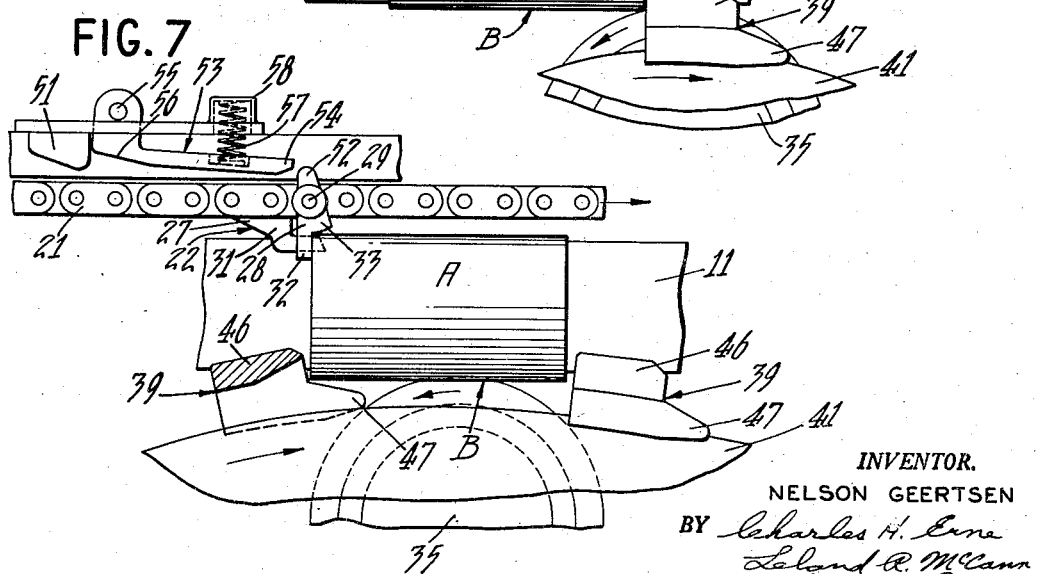

United States Patent Office 2,881,729
Patented Apr. 14, 1959

2,881,729

SOLDER WIPER

Nelson Geertsen, Oak Park, Ill., assignor to American Can Company, New York, N.Y., a corporation of New Jersey Application February 11, 1955, Serial No. 487,577

6 Claims. (Cl. 113—97)

The present invention relates to solder wiper mechanisms having movable shields for protecting the interiors of can bodies against the entrance of solder pellets during the soldering of can body side seams and has particular reference to devices for insuring contact between the can bodies and the shields.

An object of the instant invention is the provision in a solder wiper mechanism of yieldable devices which act against the can bodies to be wiped to close up any gaps between a body and its shield so that excess solder in the form of pellets cannot be scraped off and thrown into the body.

Another object is the provision of such devices which advance the bodies to close the gap between the leading shields and the leading end of the bodies and which permit reverse movement of the bodies to close the gap between the rear end of the bodies and the following shields to protect the bodies against entrance of solder pellets at both ends of the bodies.

Another object is the provision of such devices which compensate for stretching of the usual can body conveyor chains and for unequal spacing of the conveyor feed dogs and the shields used in solder wiper mechanisms.

Another object is the provision of such devices which bring the can body and its shield into body protecting position at an advantageous time in the cycle of operation of the mechanism so that the shield is better adapted to receive the body without lifting or otherwise shifting the body out of its path of travel through the mechanism.

Numerous other objects and advantages of the invention will be apparent as it is better understood from the following description, which, taken in connection with the accompanying drawings, discloses a preferred embodiment thereof.

Referring to the drawings:

Figs. 4, 5, 6 and 7 are enlarged schematic views showing different positions of a shield and associated machine parts before and during a body side seam wiping operation.

As a preferred or exemplary embodiment of the instant invention the drawings illustrate principal parts of the wiper section of a sheet metal can body side seam coating or soldering machine such as the machine disclosed in United States Patent 2,161,839 issued June 13, 1939, to C. S. Woolford on Solder Wiper. In such a machine, open ended can bodies A having longitudinal side seams B externally coated with freshly applied molten solder are conveyed in spaced and timed relation in a continuous procession along a straight line path of travel extending longitudinally of the machine past a solder wiper where excess solder on the seams is wiped off.

Figure 1:
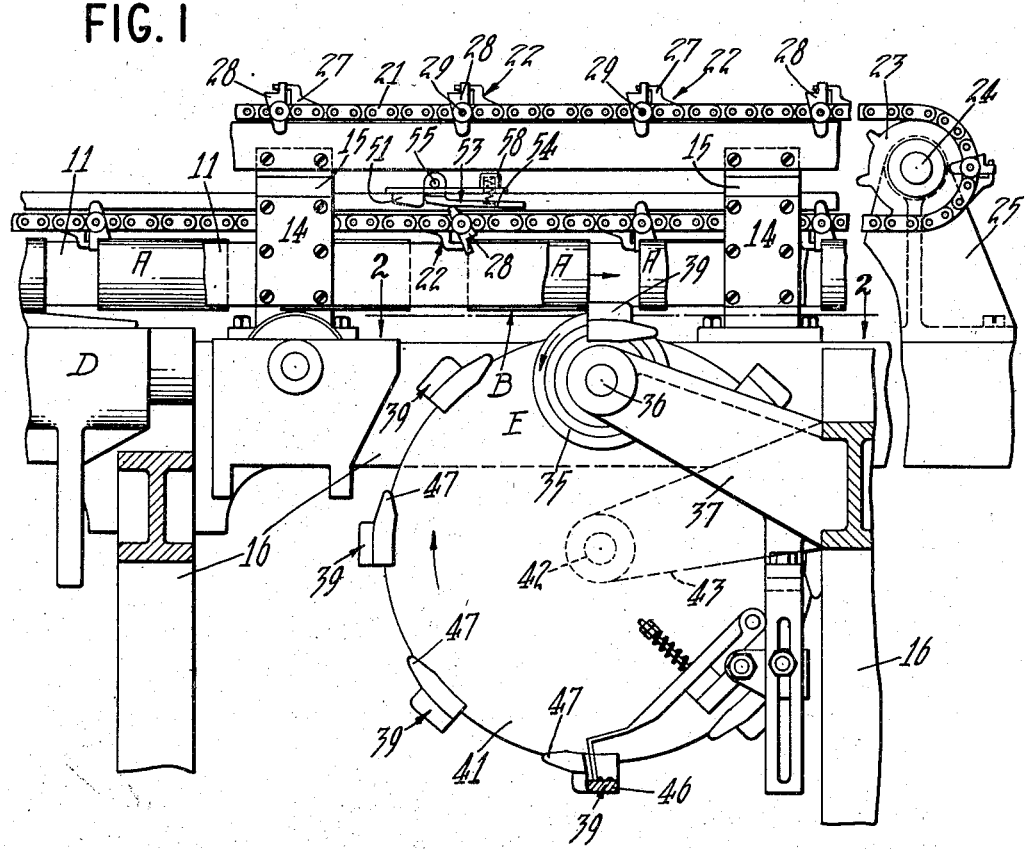
Figure 1 is a side elevation of the wiper section of a can body soldering machine having a solder wiper mechanism embodying the instant invention, parts being broken away and parts in section.

During the passage of the bodies A through the machine they travel along and are supported by an outside horn 11 (Fig. 1) which comprises a pair of spaced and parallel guide bars having curved inner faces as shown in the above mentioned Woolford patent. These bars between them support the can bodies and at the same time maintain them in a rounded condition. The horn bars are secured to pairs of side plates 14 which depend from overhanging brackets 15 spaced along and mounted on a main frame 16 of the soldering machine.

The bodies A are propelled along the horn 11 in their spaced and timed relation, in the direction of the arrow (Fig. 1), by an endless chain conveyor 21 having feed dogs 22 secured thereto at spaced intervals for gripping and propelling engagement with the rear edge of the bodies. The conveyor 21 extends the full length of the machine and is operated continuously in any suitable manner to carry the can bodies through a soldering station D, a wiping station E and several other idle and working stations. At the wiper end of the machine, the conveyor 21 operates over an idler sprocket 23 (Fig. 1) mounted on a shaft 24 journaled in a bearing bracket 25 secured to the main frame 16.

The feed dogs 22 preferably are of the character disclosed in United States Patent 2,319,281 issued May 18, 1943, to W. P. Winters on Conveyor. Such feed dogs preferably comprise a fixed link or carrier member 27 (Fig. 6) and a movable clamping member 28 pivotally connected to the carrier member by a pivot pin 29, although the dog may comprise merely a movable member if desired. The link member 27 is formed with a depending fixed jaw 31 which projects into the can body adjacent its rear edge as shown in Fig. 6. The clamping member 28 is formed with a pair of spaced and parallel depending stop lugs 32 which straddle the fixed jaw 31 and extend down in engagement with the rear edge of the can body. Between the stop lugs 32, the clamping member 28 is formed with a clamping jaw 33 which frictionally engages against the outer surface of the can body adjacent its rear edge and clamps the body tightly against the fixed jaw 31 of the carrier member 27 as shown in the above mentioned Winters Patent 2,319,281 to prevent the body from turning and to thereby maintain its side seam B in proper location for soldering and wiping.

Figure 2:
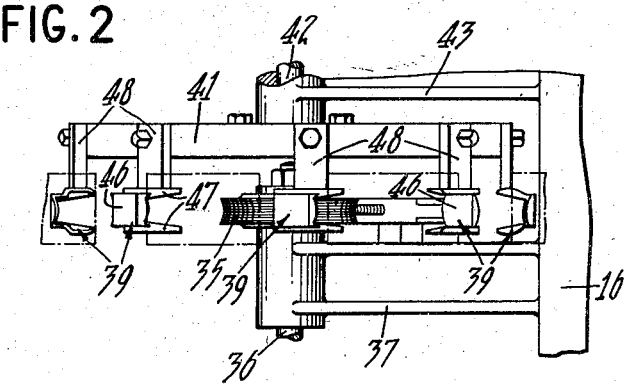
Fig. 2 is a top plan view taken substantially along a plane indicated by the line 2—2 in Fig. 1, parts being broken away.

The excess solder is removed from the side seams B of the spaced and moving can bodies A by a solder wiper which comprises a rotating wiper wheel 35 (Figs 1 and 2) as shown in the Woolford Patent 2,161,839 above mentioned. The wiper wheel 35 is mounted on one end of a shaft 36 which is journaled in a bearing bracket 37 projecting out from the machine frame 16. The shaft 36 and the wiper wheel 35 connected thereto are rotated rapidly in any suitable manner in a direction opposite to that of the travel of the bodies along the horn 11 as indicated by the arrow on the wheel 35.

When a can body A moves past the wiper station E the outer periphery of the wiper wheel 35 engages against the body side seam B and wipes away any loose or soft solder adhering thereto. It is this solder in the form of pellets which sometimes is thrown or catapulted off the rapidly turning wheel 35, especially when the wheel becomes loaded, and enters the interior of the bodies to contaminate them if no protection is provided.

Figure 3:
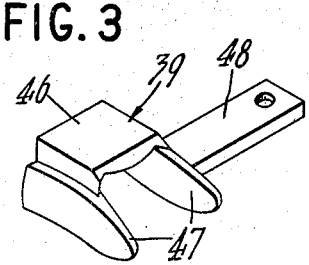
Fig. 3 is an enlarged perspective view of one of the shields used in the mechanism.

This flying solder is prevented from entering the can bodies A by shields 39 (Figs. 1, 2 and 3) which are movable into the spaces between adjacent can bodies and which cover the wiper wheel as one body moves away from the wheel and a following body approaches it. These shields 39 are carried on and are equally spaced around the outer periphery of a disc 41 mounted on a shaft 42 journaled in a bearing bracket 43 projecting from the machine frame 16. The disc 41 is rotated continuously in any suitable manner in synchronism with the travel of the bodies A along the horn 11. This rotation positions each shield 39 in place between adjacent bodies at the proper time.

Each shield 39 preferably comprises a top bridge member 46 (Fig. 3) having depending spaced parallel side wings 47 and a laterally extending lug 48 used to secure the shield to the disc 41. The bridge member 46 when rotated into shielding position extends into the space between the can bodies A while the wings 47 extend down adjacent the sides of the wiper wheel 35 thereby covering it at top and sides.

Provision is made to insure tight engagement of the leading edge of the can body A with the following edge of the bridge member 46 of a shield 39 during the wiping operation to prevent entrance of solder pellets into the body through any space between the body and the shield, brought about by stretching of the chain conveyor 21 or other causes which would create such a space. This tight engagement is brought about by a slight advancement of each can body under yieldable pressure as it approaches the wiping station where the shield is interposed between the bodies.

The advancement of the can bodies is brought about by cam action. For this purpose there is provided a short stationary tapered edge cam 51 disposed adjacent the conveyor 21 at the wiping station E, above the path of travel of the gripper dogs 22 for engagement with an upwardly projecting lug 52 of the clamping member 28 of the dogs. Immediately adjacent the stationary cam 51 and in following order for subsequent engagement by the dog lugs 52, there is provided a yieldable edge cam 53. This yieldable cam 53 preferably comprises an elongated arm section 54 disposed at an angle sloping toward the path of travel of the conveyor 21 as shown in Fig. 4, and hingeably mounted at one end on a pivot pin 55 adjacent the stationary cam 51. At the hinge end of the cam the arm section 54 is formed with a tapered section 56. Adjacent the opposite end of the cam, the arm section 54 is backed up by a compression spring 57 interposed between the arm and a stationary retainer housing 58.

The cams 51, 53 are located in a predetermined position relative to the wiping station E so that as a can body A is approaching the station and a shield 39 is moving into the space between the approaching body and the body immediately ahead of it, the lug 52 on the clamping member 28 of the gripper fingers 22 engages the tapered face of the stationary cam 51 and is thus rocked in a counterclockwise direction as viewed in Fig. 4. The purpose of this stationary cam 51 is to suddenly exert considerable pressure against the clamping member 28 to release it from its tight fitting engagement against the can body and thereby unlock or free the body at least momentarily from the grip of the feed dog 22. As soon as the lug 52 rides off the stationary cam 51 the clamping member 28 returns to engagement against the can body but only lightly engages the body.

Immediately following this temporary release of the can body, the lug 52 advancing with the conveyor 21 engages the tapered section 56 of the yieldable cam 53 as shown in Fig. 5 and gradually rocks the clamping member 28 in a counterclockwise direction again to cause the stop lugs 32 on the member to push the body forward away from the feed dog 22. This body advancing action continues while the lug 52 rides onto and along the arm section 54 of the cam 53 and is arrested only when the leading edge of the cam body engages against the following edge of the bridge member 46 of the shield 39 moved into place ahead of the body as shown in Fig. 6. This body advancing action is effected under the pressure of the compression spring 57, the spring yielding until the body is engaged with the shield 39 and thereafter maintaining a pressure on the lug 52 to keep the body in tight engagement with the shield during the seam wiping action which takes place while the body and the shield pass over the wiping wheel 35.

When the leading end of the can body A advances beyond the range of the flying solder pellets as shown in Fig. 7 and the shield 39 starts to move downwardly away from the body, the lug 52 on the dog 22 rides off the end of the arm section 54 of the cam 53 as shown in Fig. 7 and thereby is released from the pressure of the spring 57, the terminal end of the arm 54 being located relative to the wiping wheel 35 to effect this action after the wheel 35 is well on to the seam of the body A.

As soon as the movable member 28 of the feeding dog 22 is released from the cam 53, the wiping wheel 35, due to its rotation in reverse of the direction of movement of the can bodies A, momentarily decelerates the can body and pushes it backwardly relative to the conveyer 21. This deceleration of the body rocks the clamping member 28 in a clockwise direction towards its locked position and continues until the body is once again clamped against the fixed jaw 31 and prevented from chattering or bouncing during its further advancement to the discharge end of the conveyor 21.

The deceleration of the body which is effected by the reverse rotation of the wiping wheel 35 also results in a backward movement of the body relative to the following shield 39, until the gap which would otherwise exist between the trailing edge of the body and the leading edge of this following shield is substantially closed up, as seen in Fig. 7, to prevent the molten solder from splashing or bouncing upwardly through this gap and entering into the rear end of the body or passing over the shield and entering into the following body.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A solder wiping mechanism for soldering machines, comprising in combination a conveyor for advancing along a path of travel a can body having a soldered side seam, a feed dog on said conveyor, said feed dog having a fixed member and a movable member for cooperatively gripping said can body during its advancement, a wiper located adjacent said path of travel and having engagement with the side seam of said passing can body during its advancement for wiping its soldered side seam, a shield for said can body, means synchronized with said conveyor for advancing said shield into position over said wiper in forwardly spaced relationship to said body, and an arm cam having a pivotal mounting and maintained under resilient pressure for yieldably engaging and shifting the movable member of said feed dog for moving said movable member to advance said body relative to said conveyor and into engagement with said shield to close the space therebetween and to yieldably maintain said engagement during the initial portion of the wiping operation to protect the interior of said body against the entrance fo solder pellets thrown from said wiper.

2. A solder wiping mechanism of the character defined in claim 1 wherein there is provided in advance of said arm cam a stationary rigid cam engageable with said movable member of said feed dog for positively and forcibly moving said movable member relative to said fixed member to release said body from the gripping action of said dog to facilitate and insure subsequent advancement of said body relative to said conveyor by said arm cam.

3. A solder wiping mechanism for soldering machines, comprising in combination a conveyor, a lug movably mounted on said conveyor for engaging the rear edge of a cam body having a soldered side seam to advance said body along a predetermined path of travel, a wiper located adjacent said path of travel for wiping said soldered side seam in a direction relatively opposite to the movement of said body as it is advanced past said wiper, leading and trailing shields for said can body spaced apart a distance slightly greater than the length of said seam, means synchronized with said conveyor for moving said shields into positions at opposite ends of said seam and for advancing said shields over said wiper with said seam therebetween and with the leading shield spaced forwardly from the leading end of said seam, and lug moving means disposed adjacent said conveyor for moving said lug forward relative to said conveyor to move said body forward relative to said conveyor and into engagement with said leading shield to close the space between said body and shield during the initial portion of the wiping operation to protect the interior of said body against entrance into the leading open end of the body of solder pellets thrown from said wiper, said lug moving means thereafter freeing said lug to move back relative to the conveyor so that said wiping engagement between said wiper and said advancing seam urges the can body and lug rearwardly and the trailing end of said body is abutted against said trailing shield to prevent solder pellets from entering said body through the open trailing end of said body.

4. The solder wiping mechanism of the character defined in claim 3 wherein said lug moving means comprises an arm pivotally mounted adjacent said path of the can body and biased toward the path of said lug for resilient engagement with said lug and with the free end of said arm extending in the direction of advancement of said body and terminating short of the point at which said body is engaged by said wiper, whereby said lug is moved forward relative to the conveyor during its engagement with said arm and said lug is free to move back when it passes beyond the free end of said arm.

5. A solder wiping mechanism for soldering machines, comprising in combination a conveyor having movable feed dogs attached thereto in spaced relation therealong and engageable against the rear ends of can bodies having soldered side seams disposed in longitudinal alignment for advancing said can bodies along a path of travel in spaced relation, a rotary wiper located adjacent said path of travel and having frictional engagement with the side seams of said passing can bodies during their advancement for wiping said side seams, a plurality of shields for said can bodies, means for interposing said shields into the spaces between adjacent can bodies, an arm cam disposed adjacent said path of travel on the approach side of said wiper and having a pivotal mounting, said cam being maintained under resilient pressure for yieldably engaging and shifting said movable feed dogs for advancing each of said bodies individually into engagement with the trailing end of its forwardly adjacent shield to close any space between the leading end of said body and the trailing end of said shield to protect the interior of said body against the entrance of solder pellets thrown from said wiper adjacent the leading end of said body, said arm cam terminating short of said wiper to release said feed dogs after the leading ends of said bodies pass said wiper to effect through the frictional engagement between said wiper and said can bodies a reverse movement of each of said bodies toward the following shield to close up the gap between the body and the following shield to protect the interior of said body against the entrance of solder pellets thrown from said wiper adjacent the back end of said body.

6. A solder wiping mechanism for soldering machines, comprising in combination a conveyor for advancing along a path of travel in spaced relation a plurality of can bodies having soldered side seams disposed in longitudinal alignment, a plurality of feed dogs mounted on said conveyor, each of said feed dogs having a fixed member and a pivotally mounted movable member for cooperatively gripping the rear end of a can body during its advancement, a rotary wiper disposed adjacent said path of travel and having frictional engagement with said advancing can bodies for wiping their soldered side seams, a plurality of shields mounted on a rotary wheel and insertable individually over said wiper and into the spaces between said can bodies, stationary cam means disposed on the approach side of said wiper and engageable against said pivotally mounted members to positively and forcibly rock said members to release said can bodies from the gripping action of said feed dogs, and yieldably mounted cam means disposed between said stationary cam means and said wiper for again rocking said movable members to advance said released can bodies relative to said conveyor to move said can bodies into engagement with their forwardly adjacent shields to close any spaces between the rear ends of said shields and the leading ends of said can bodies and for maintaining said engagement during the initial portion of the wiping operation to protect the interiors of said bodies against the entrance of solder pellets thrown from said rotary wiper adjacent the leading ends of said bodies and for releasing said movable members prior to the termination of said wiping operation to permit the frictional engagement between said wiper and a said can body to move said can and its associated movable member of a feed dog rearwardly and also to close up the gap between said body and its rearwardly adjacent shield to protect the interior of each of said bodies against the entrance of solder pellets thrown from said wiper as the trailing open end of each body passes over the wiper.

References Cited in the file of this patent

UNITED STATES PATENTS

| | | |
|---|---|---|
| 2,161,839 | Woolford | June 13, 1939 |
| 2,460,327 | Woolford | Feb. 1, 1949 |
| 2,567,264 | Winters et al. | Sept. 11, 1951 |